(12) United States Patent
Michmerhuizen et al.

(10) Patent No.: US 7,870,142 B2
(45) Date of Patent: Jan. 11, 2011

(54) TEXT TO GRAMMAR ENHANCEMENTS FOR MEDIA FILES

(75) Inventors: Mark Michmerhuizen, Holland, MI (US); Mark Zeinstra, Holland, MI (US); Brian L. Douthitt, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 11/517,832

(22) Filed: Sep. 8, 2006

(65) Prior Publication Data

US 2007/0233725 A1 Oct. 4, 2007

Related U.S. Application Data

(60) Provisional application No. 60/789,176, filed on Apr. 4, 2006.

(51) Int. Cl.
G06F 17/30 (2006.01)
G10L 13/02 (2006.01)
G10L 13/08 (2006.01)

(52) U.S. Cl. .................. 707/755; 704/258; 704/275; 701/36

(58) Field of Classification Search .......... 707/1, 707/755; 709/219; 704/277, 1, 273, 275, 704/257, 258, 249; 705/14; 701/1, 29, 202; 434/167; 455/3.05, 574
See application file for complete search history.

(56) References Cited

U.S. PATENT DOCUMENTS

| | | | |
|---|---|---|---|
| 3,704,345 A * | 11/1972 | Coker et al. ............ | 704/266 |
| 4,827,520 A | 5/1989 | Zeinstra | |
| 5,113,182 A | 5/1992 | Suman et al. | |
| 5,214,707 A * | 5/1993 | Fujimoto et al. ........ | 704/275 |
| 5,278,547 A | 1/1994 | Suman et al. | |
| 5,384,893 A * | 1/1995 | Hutchins ................ | 704/267 |
| 5,475,366 A | 12/1995 | Van Lente et al. | |

(Continued)

FOREIGN PATENT DOCUMENTS

DE 10 2004 016 319 A1 11/2004

(Continued)

OTHER PUBLICATIONS

Wikipedia—Speak & Spell (toy), retrieved Sep. 2, 2010.*

(Continued)

*Primary Examiner*—James Trujillo
*Assistant Examiner*—William Spieler
(74) *Attorney, Agent, or Firm*—Foley & Lardner LLP

(57) ABSTRACT

A control system in a vehicle for extracting meta data from a digital media storage device over a communication link. The system includes a communication module for establishing a communication link with the digital media storage device. The system also includes a processing module coupled to the communication module. The processing module is configured to retrieve, via the communication module, meta data associated with a media file from the digital media storage device. The meta data includes a plurality of entries, wherein at least one of the plurality of entries includes text data. The processing module is also configured to compare the text data of the entries with a set of data files stored in a database. The system also includes a memory module configured to store the plurality of entries retrieved from the digital media storage device.

20 Claims, 8 Drawing Sheets

U.S. PATENT DOCUMENTS

| | | | |
|---|---|---|---|
| 5,479,155 A | | 12/1995 | Zeinstra et al. |
| 5,479,157 A | | 12/1995 | Suman et al. |
| 5,583,485 A | | 12/1996 | Van Lente et al. |
| 5,614,885 A | | 3/1997 | Van Lente et al. |
| 5,614,891 A | | 3/1997 | Zeinstra et al. |
| 5,619,190 A | | 4/1997 | Duckworth et al. |
| 5,627,529 A | | 5/1997 | Duckworth et al. |
| 5,646,701 A | | 7/1997 | Duckworth et al. |
| 5,661,455 A | | 8/1997 | Van Lente et al. |
| 5,691,848 A | | 11/1997 | Van Lente et al. |
| 5,699,044 A | | 12/1997 | Van Lente et al. |
| 5,703,308 A | * | 12/1997 | Tashiro et al. ............... 84/609 |
| 5,708,415 A | | 1/1998 | Van Lente et al. |
| 5,717,387 A | | 2/1998 | Suman et al. |
| 5,854,593 A | | 12/1998 | Dykema et al. |
| 5,903,226 A | | 5/1999 | Suman et al. |
| 5,926,087 A | | 7/1999 | Busch et al. |
| 6,028,537 A | | 2/2000 | Suman et al. |
| 6,078,885 A | * | 6/2000 | Beutnagel ............... 704/258 |
| 6,154,148 A | | 11/2000 | Fluharty et al. |
| 6,202,008 B1 | | 3/2001 | Beckert et al. |
| 6,389,337 B1 | * | 5/2002 | Kolls ............... 701/29 |
| 6,526,335 B1 | * | 2/2003 | Treyz et al. ............... 701/1 |
| 6,584,181 B1 | * | 6/2003 | Aktas et al. ............... 379/88.23 |
| 6,600,430 B2 | | 7/2003 | Minagawa et al. |
| 6,622,083 B1 | * | 9/2003 | Knockeart et al. ............ 701/202 |
| 6,801,893 B1 | * | 10/2004 | Backfried et al. ............ 704/257 |
| 6,874,018 B2 | * | 3/2005 | Wu ............... 709/219 |
| 6,928,261 B2 | | 8/2005 | Hasegawa et al. |
| 6,993,532 B1 | | 1/2006 | Platt et al. |
| 7,024,424 B1 | | 4/2006 | Platt et al. |
| 7,047,039 B2 | | 5/2006 | Lalley |
| 7,257,426 B1 | | 8/2007 | Witkowski et al. |
| 2002/0048224 A1 | | 4/2002 | Dygert et al. |
| 2002/0049717 A1 | * | 4/2002 | Routtenberg et al. ............ 707/1 |
| 2002/0082831 A1 | * | 6/2002 | Hwang et al. ............... 704/249 |
| 2002/0086719 A1 | * | 7/2002 | Kedia et al. ............... 455/574 |
| 2002/0090596 A1 | * | 7/2002 | Sosoka et al. ............... 434/167 |
| 2002/0091706 A1 | | 7/2002 | Anderson et al. |
| 2002/0107973 A1 | | 8/2002 | Lennon et al. |
| 2002/0120925 A1 | | 8/2002 | Logan |
| 2002/0197955 A1 | | 12/2002 | Witkowski et al. |
| 2003/0014767 A1 | | 1/2003 | Stumphauzer, II |
| 2003/0032419 A1 | * | 2/2003 | Shibasaki et al. ............ 455/419 |
| 2003/0093260 A1 | * | 5/2003 | Dagtas et al. ............... 704/1 |
| 2003/0109218 A1 | * | 6/2003 | Pourkeramati et al. ..... 455/3.05 |
| 2003/0110079 A1 | * | 6/2003 | Weisman et al. ............ 705/14 |
| 2003/0137543 A1 | | 7/2003 | Anderson et al. |
| 2003/0158737 A1 | * | 8/2003 | Csicsatka ............... 704/273 |
| 2003/0163823 A1 | | 8/2003 | Logan et al. |
| 2003/0177013 A1 | * | 9/2003 | Falcon et al. ............... 704/275 |
| 2003/0228879 A1 | | 12/2003 | Witkowski et al. |
| 2004/0022137 A1 | | 2/2004 | Campbell et al. |
| 2004/0033821 A1 | | 2/2004 | Slesak et al. |
| 2004/0048622 A1 | | 3/2004 | Witkowski et al. |
| 2004/0089141 A1 | | 5/2004 | Georges et al. |
| 2004/0110472 A1 | | 6/2004 | Witkowski et al. |
| 2004/0111271 A1 | * | 6/2004 | Tischer ............... 704/277 |
| 2004/0117442 A1 | | 6/2004 | Thielen |
| 2004/0194611 A1 | * | 10/2004 | Kawana ............... 84/600 |
| 2004/0203379 A1 | | 10/2004 | Witkowski et al. |
| 2005/0038813 A1 | | 2/2005 | Apparao et al. |
| 2005/0090279 A9 | | 4/2005 | Witkowski et al. |
| 2005/0155068 A1 | | 7/2005 | Chang |
| 2005/0223406 A1 | | 10/2005 | Vitito |
| 2005/0235326 A1 | | 10/2005 | Vitito |
| 2005/0235327 A1 | | 10/2005 | Vitito |
| 2005/0239434 A1 | | 10/2005 | Marlowe |
| 2005/0281414 A1 | | 12/2005 | Simon et al. |
| 2006/0034481 A1 | | 2/2006 | Barzegar et al. |
| 2006/0070102 A1 | | 3/2006 | Vitito |
| 2006/0168627 A1 | | 7/2006 | Zeinstra et al. |
| 2007/0061067 A1 | | 3/2007 | Zeinstra et al. |
| 2007/0082706 A1 | | 4/2007 | Campbell et al. |
| 2007/0198563 A1 | | 8/2007 | Apparao et al. |
| 2007/0233725 A1 | | 10/2007 | Michmerhuizen et al. |

FOREIGN PATENT DOCUMENTS

| | | | |
|---|---|---|---|
| JP | 05290382 A | * | 11/1993 |
| JP | 2004-309795 A | | 11/2004 |
| WO | WO 2005/019985 A2 | | 3/2005 |
| WO | WO 2007/123797 A1 | | 11/2007 |
| WO | WO 2007/123798 A1 | | 11/2007 |

OTHER PUBLICATIONS

International Search Report and Written Opinion for Application No. PCT/US2007/008063, Sep. 25, 2007, 8 pages.

International Search Report and Written Opinion for Application No. PCT/US2007/008064, Sep. 14, 2007, 8 pages.

Gilroy, Amy, "Sony Joins In Music Streaming From Cellphones to Car Audio," printed from website www.twice.com on Aug. 17, 2006, 2 pages.

Jain, Ankit et al., "Standard boosts automotive Bluetooth streaming," Automotive Design Line, printed from website www.automotivedesignline.com on Jun. 15, 2006, 6 pages.

Johnston, Lisa, "ANYCOM Announces Bluetooth Adapter for iPod nano," TWICE: This Week in Consumer Electronics, printed from website www.twice.com on Aug. 17, 2006, 1 page.

Pioneer DEH-P9800BT, CD receiver with MP3/WMA playback and Bluetooth wireless, Crutchfield, printed from website www.crutchfield.com on Nov. 27, 2006, 3 pages.

Sony MEX-BT5000, CD receiver with Bluetooth technology and MP3/WMA playback, Crutchfield, printed from website www.crutchfield.com on Nov. 27, 2006, 2 pages.

International Search Report and Written Opinion for International Patent Application No. PCT/US2007/008064, mailed Sep. 14, 2007, 7 pages.

* cited by examiner

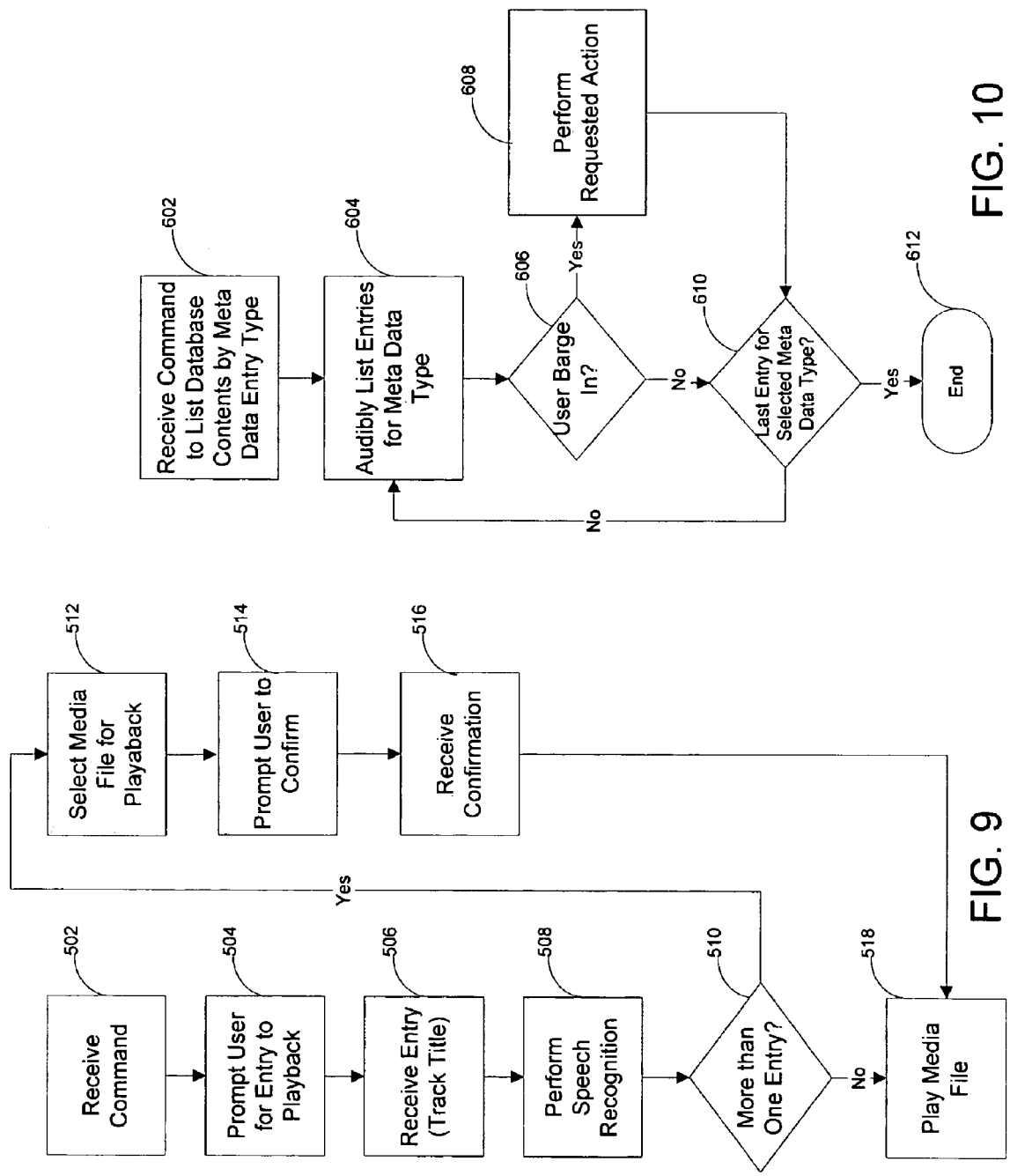

TEXT TO GRAMMAR ENHANCEMENTS FOR MEDIA FILES

CROSS-REFERENCE TO RELATED PATENT APPLICATIONS

This application claims priority to U.S. Provisional Patent Application No. 60/789,176, which was filed on Apr. 4, 2006.

FIELD OF THE INVENTION

The present invention relates generally to the field of data extraction from a digital audio/video source in a vehicle and in particular, a system and method for extracting and processing meta data from media files accessible from a digital media storage device, such as a media player, in the vehicle.

BACKGROUND OF THE INVENTION

Vehicles typically include a number of electronic systems such as an audio system, a mobile telephone system, a navigation system, video entertainment system, etc. Along with those systems, digital media storage devices (i.e., digital audio/video players or MP3 players) may be setup in the vehicle for a user to access digital audio or video content stored on the digital media storage device. A conventional digital media storage device includes a data storage device (i.e., memory) and an embedded software application that allows a user to transfer media files to the player and create custom lists of selected media files, referred to as playlists. Media files may be transferred to the memory of the player from various sources, including disks (e.g., CDs, DVDs, etc.) and Internet sites. Most players are configured to be coupled to a personal computer via a connection port (e.g., USB port, parallel port, serial port, etc.) in order to transfer media files. The media files typically include data, referred to as meta data, which identifies the contents of the file. For example, with digital audio files, such as MP3 files, the meta data comprises a tagging format which may include the title of the song, the artist's name, the title of the album, track number, genre, etc. The tagging format for MP3 (i.e., MPEG Audio Layer III) files is commonly referred to as ID3.

A digital media storage device is typically configured to include a memory having one or more media files stored therein. A digital media storage device in a vehicle may be configured to be coupled to or integrated with other vehicle electronic systems, such as the audio system, for playing the media files from the player. In one known configuration, a digital media storage device may be connected via an analog audio output (e.g., a headphone jack) from the digital media storage device to the auxiliary input of the vehicle's audio system, such that the playback is controlled by the controls of the digital media storage device. In another known configuration, the digital media storage device's control interface is coupled to the control interface of the head unit of an audio system (i.e., radio), in addition to connecting the analog audio output of the digital media storage device to auxiliary input of the vehicle's audio system. In this configuration, the user can control the playback of the media from the head unit of the audio system. Yet, in another configuration, an audio system may include a database of meta data about certain media files. The audio system is configured to determine the meta data of a media file based on a unique identifier relating to that file.

It would be advantageous to provide a system for extracting meta data from a digital media storage device in a vehicle that is configured to: 1) establish a communication link between a control module and a digital media storage device; 2) identify media files stored on a digital media storage device; 3) retrieve meta data from a media file of the digital media storage device upon receiving a command from a user; 4) automatically retrieve meta data from a media file of the digital media storage device upon establishing a wireless communication link with the digital media storage device; 5) generate and/or update a database of meta data based on the meta data extracted from the digital media storage device, including converting the information to phonemic representations so that a user may access and manipulate the media files via voice commands and speech recognition; 6) audibly list the meta data entries of a media file based on an audible command of the user; 7) generate a second database of meta data using the meta data extracted from a second digital media storage device, wherein the meta data of the first digital media storage device is retained across power cycles, thereby eliminating the time consuming process of extracting meta data each time a digital media storage device is connected to the system; and 8) provide for the use of multiple databases concurrently, for example, when two or more digital media storage devices are linked to the control module concurrently.

SUMMARY OF THE INVENTION

One embodiment of the invention relates to a method for extracting meta data from a digital media storage device in a vehicle over a communication link between a control system of the vehicle and the digital media storage device. The method includes the step of identifying a media file on the digital media storage device. The method also includes the step of retrieving meta data from a media file. The meta data includes a plurality of entries, wherein at least one of the plurality of entries includes text data. The method also includes the step of identifying the entries of the meta data that include text data. The method also includes the step of comparing the text data with a set of stored data files, the stored data files being stored in a database. If the text data matches at least one of the stored data files, the method generates an acoustic baseform of the text data based on a phonemic representation of the stored data file. If the text data does not match at least one of the stored data files, the method generates an acoustic baseform of the text data based on a phonemic representation of the text data from the entry. The method also includes the step of storing the plurality of entries in a memory.

Another embodiment of the invention relates to a control system in a vehicle for extracting meta data from a digital media storage device over a communication link. The system includes a communication module for establishing a communication link with the digital media storage device. The system also includes a processing module coupled to the communication module. The processing module is configured to retrieve, via the communication module, meta data associated with a media file from the digital media storage device. The meta data includes a plurality of entries, wherein at least one of the plurality of entries includes text data. The processing module is also configured to compare the text data of the entries with a set of data files stored in a database. The system also includes a memory module configured to store the plurality of entries retrieved from the digital media storage device.

BRIEF DESCRIPTION OF THE DRAWINGS

FIG. 9 is a process flow diagram illustrating a method of receiving a request from a user to play a media file using speech recognition with the in-vehicle control system of FIG. 3 according to one exemplary embodiment.

FIG. 10 is a process flow diagram illustrating a method of listing media file entries to a user with the in-vehicle control system of FIG. 3 according to one exemplary embodiment.

DETAILED DESCRIPTION OF THE EXEMPLARY EMBODIMENTS

Figure 1:
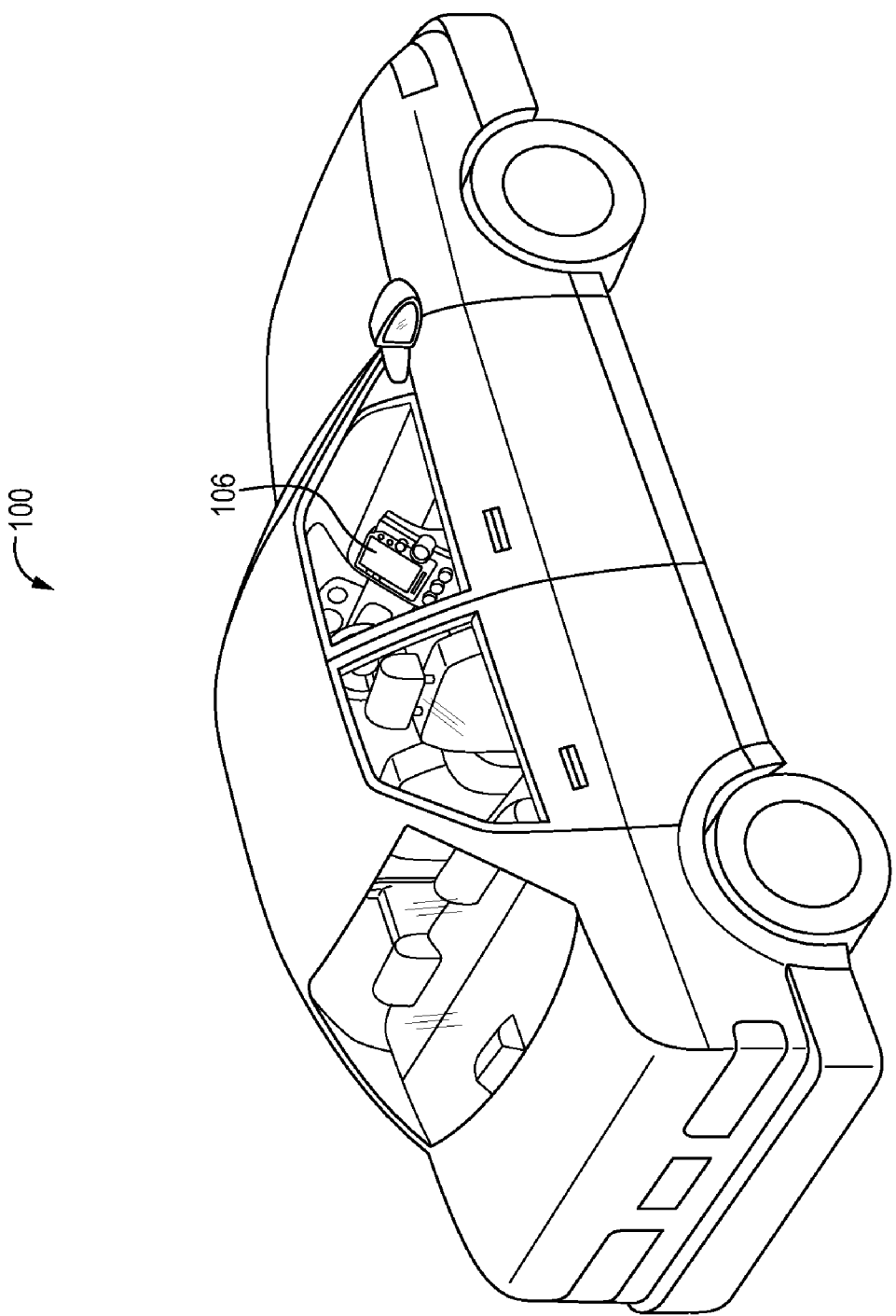
FIG. 1 is a perspective view of a motor vehicle that includes a number of vehicle systems, including an in-vehicle control system according to one exemplary embodiment.

Referring to FIG. 1, a vehicle 100 includes a number of subsystems for user convenience. Vehicle 100 generally includes a heating, ventilation, and air-conditioning (HVAC) system, a sound system, and an in-vehicle control system 106. The HVAC system and sound system may be coupled to in-vehicle control system 106, which is capable of controlling and monitoring both systems, automatically or by a manual user command. It is noted that in various exemplary embodiments: vehicle 100, the HVAC system, and the sound system may be of any past, present, or future design that is capable of housing (in the case of vehicle 100) and interacting with in-vehicle control system 106.

Figure 2:
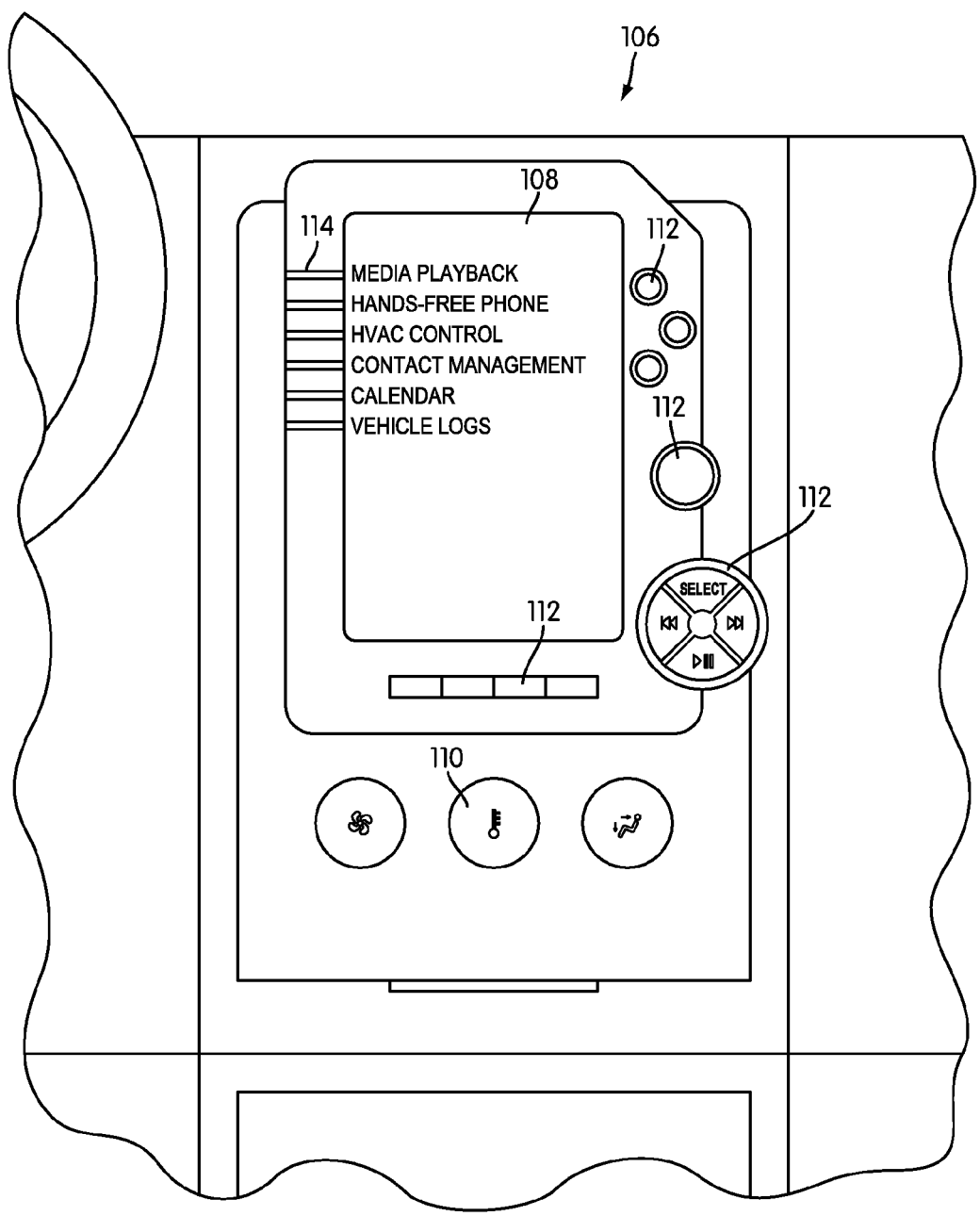
FIG. 2 is a front elevation view of the user interface of the in-vehicle control system of FIG. 1 according to one exemplary embodiment.

Referring to FIG. 2, one exemplary embodiment of in-vehicle control system 106 is shown. In-vehicle control system 106 generally includes an output display 108, one or more knobs 110, one or more pushbuttons 112, and one or more tactile user inputs or pushbuttons 114, which facilitate controlling various vehicle functions. Output display 108 may be configured to display data related to the control of the vehicle functions. In one exemplary embodiment, output display 108 may be a touch-screen display, while in other exemplary embodiments, may be any other non-touch sensitive display. In still other exemplary embodiments, output display 108 may be of any technology (e.g. LCD, DLP, plasma, CRT), configuration (e.g. portrait or landscape), or shape (e.g. polygonal, curved, curvilinear). Knobs 110 and pushbuttons 112 and 114 may be configured: (i) to control functions of the HVAC system such as fan speed, cabin temperature, or routing of air flow, (ii) to control playback of media files over the sound system, (iii) to control retrieval of phonebook entries, or (iv) to control any other desired vehicle function. Pushbuttons 114 typically allow for the selection and display of various functions of in-vehicle control system 106 including HVAC system control, sound system control, hands-free phone use, contact or address/phone book management, calendar viewing/modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allows the user to connect in-vehicle control system 106 to a mobile phone so that speaking into the vehicle console of in-vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit and/or dial one or more entries containing personal contact information, by use of a tactile or oral command. The operation of pushbutton 114 for calendar management may display a menu screen or execute commands that allow the user to view, list, select, sort, search for, edit and/or create one or more entries containing personal schedule information by tactile or oral command. The operation of pushbutton 114 for vehicle log management may display a menu screen or execute commands that allow the user to input, view, select and/or reset information related to vehicle operation (e.g. fuel economy, engine temperature, distance to empty, etc.) by tactile or oral command.

Figure 3:
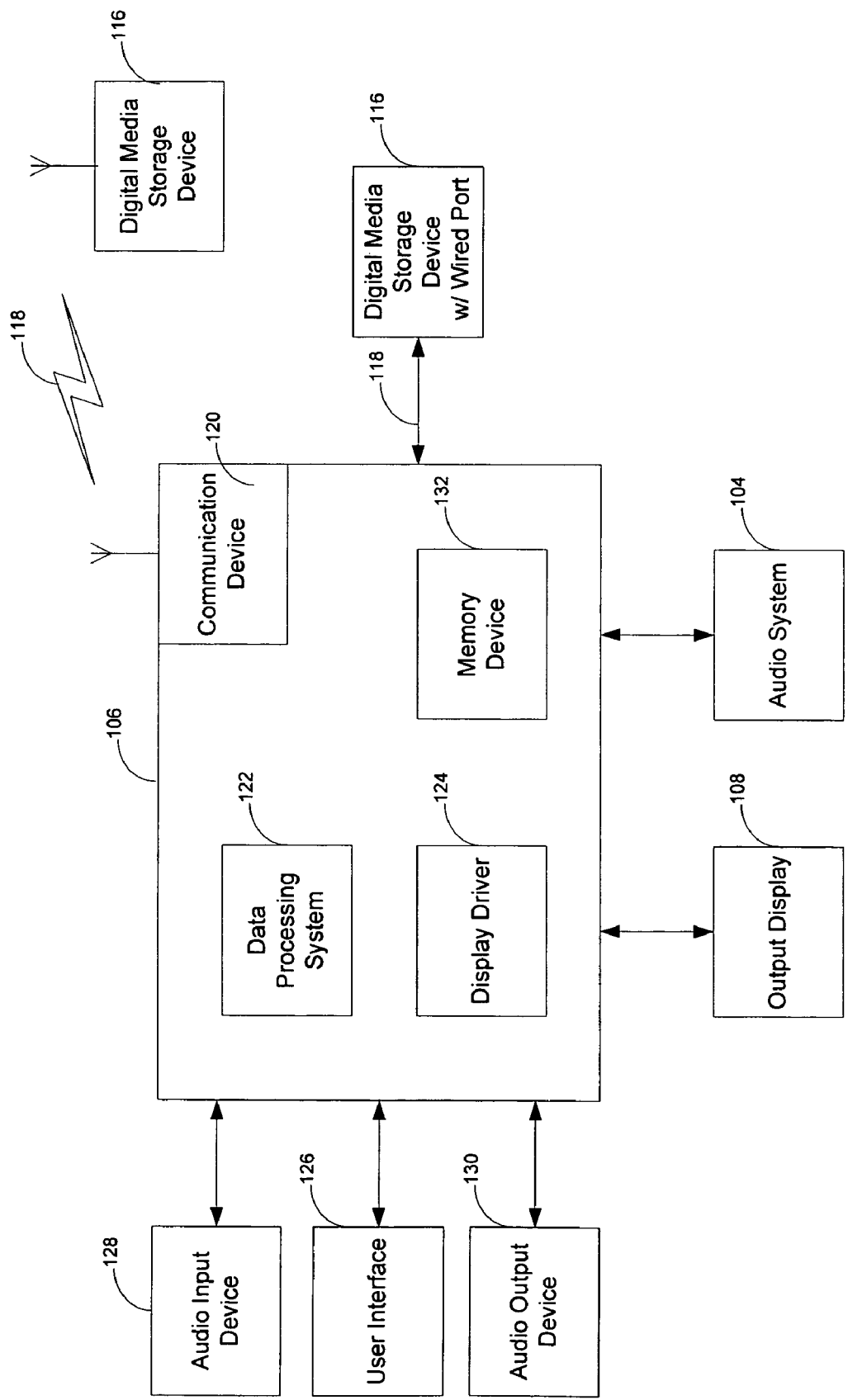
FIG. 3 is a block diagram of the in-vehicle control system of FIG. 1 that includes a speech recognition system according to one exemplary embodiment.

FIG. 3 is a block diagram of in-vehicle control system 106 for extracting meta data from a digital media storage device in a vehicle in accordance with an exemplary embodiment. The control system enables a vehicle occupant, such as a driver, to extract the meta data from a digital media storage device 116, for example the occupant's media player, and subsequently generates an acoustic baseform based on a phonemic representation of the extracted text and/or numeric data. Other vehicle occupants (e.g., passengers) may also use the system to extract the meta data from another digital media storage device 116. It should be understood that although a system for extracting meta data will be described in detail herein with reference to digital media storage device 116, one or more of the systems and methods for extracting meta data herein may be applied to, and find utility in, other types of digital storage or audio/video devices as well. For example, one or more of the systems for extracting meta data may be suitable for use with a flash drive, a micro hard drive, a USB memory stick, etc., all of which may require certain device-specific hardware and software to extract the meta data.

The exemplary system shown in FIG. 1 enables a wireless and/or wired communication link 118 to be established between an audio system 104 of vehicle 100 and digital media storage device 116 (e.g., a digital media storage device with a Bluetooth-enabled connection) of a vehicle occupant. The wired connection may include a cradle for digital media storage device 116 or a similar wired adapter, such as an analog audio output connection (e.g., a headphone jack). The following description will refer to an exemplary control system using a wireless communication link between the vehicle audio system and digital media storage device 116 of a vehicle occupant, however, it should be understood that methods and systems for retrieving and processing meta data from a digital media storage device described herein may be used in conjunction with other configurations of control systems, such as a wired connection to a vehicle occupant's digital media storage device, etc.

In FIG. 1, the in-vehicle control system 106 is coupled to audio system 104 and an antenna 105. In an alternative embodiment, in-vehicle control system 106 may be incorporated into audio system 104. Antenna 105, in conjunction with a communications device 120, for example a communications device, within in-vehicle control system 106, enables two-way communication with digital media storage device 116. Communication module 120 may be configured as a communication circuit including analog and/or digital components, such that communications device 120 is capable of transmitting and receiving short-range radio frequency ("RF") signals in any of a variety of data transmission formats, such as a Bluetooth communications protocol, an IEEE 802.11 communications protocol or other personal area network wireless communications protocols or data formats. Digital media storage device 116 may include a plurality of communications device circuits, for example, a Bluetooth communications device circuit configured to communicate with communications device 120.

In-vehicle control system 106 is also coupled to a user interface 126 and an audio input device 128. User interface 126 may be used to receive input commands from a vehicle occupant via, for example, pushbuttons, switches, a keypad, a touch screen display, etc. Alternatively, input commands to in-vehicle control system 106 may include a set of audio signals from a vehicle occupant. For example, a vehicle occupant may speak directly into the audio input device 128 to provide input commands to the in-vehicle control system 106. Audio input device 128 may include one or more audio input devices configured to receive an oral command from a vehicle occupant. The oral command may be any word or phrase that the occupant may speak, utter, or otherwise provide to cause the control system or another system to perform a function. A data processing module 122 in in-vehicle control system 106 may be used to process various data signals, such as audio signals (e.g., oral input commands) received via audio input device 128 and to recognize words or phrases in the oral command. Voice recognition technologies known in the art may be implemented in data processing module 122. For example, data processing module 122 may comprise any speech recognition software or engine such as IBM Embedded ViaVoice®, manufactured by International Business Machines Corporation.

In-vehicle control system 106 may also be coupled to an output display 108. Output display 108 may comprise a small cathode ray tube (CRT), liquid crystal display (LCD), or various other types of visual displays which are easily visible in various lighting conditions. In-vehicle control system 106 may comprise one or more analog and/or digital electrical or electronic components, and may include a microprocessor, a microcontroller, application-specific integrated circuit (ASIC), programmable logic and/or other analog and/or digital circuit elements configured to perform various input/output, control, analysis and other functions described herein. In-vehicle control system 106 may also include a memory device 132, including volatile and non-volatile memory in order to, for example, store a computer program, other software, or a data file to perform the functions described herein. Each element in vehicle 100 shown in FIG. 1 may be mounted in or coupled to the same or different interior vehicle elements such as a dashboard, an overhead console, an instrument panel, a visor, a rearview mirror, or other appropriate locations within the vehicle. Preferably, user interface 126, audio input device 128 and output display 108 are mounted in a location convenient to the vehicle occupants, in particular, the driver.

Audio system 104 may include, for example, a radio, an amplifier and at least one audio output device configured to provide audio signals to one or more vehicle occupants. The audio output devices (not shown) are configured to receive audio output data from in-vehicle control system 106 and/or other systems (e.g., a digital audio file from a digital media storage device, information prompts or other messages provided by in-vehicle control system 106, etc.). The audio output devices may be a part of the vehicle audio system 104 or may be a dedicated audio output device or audio output devices 130 serving only in-vehicle control system 106.

As mentioned above, in the exemplary system shown in FIG. 1, in-vehicle control system 106 is linked via a wireless communications link with a digital media storage device 116 of a vehicle occupant. A communication link may be established with different digital media storage devices as different occupants are enabled to use the control system. A communication link may be established, for example, in response to a command received from the user via user interface 126 or an oral command received via audio input device 128. The wireless communication link operates in accordance with a wireless communication standard, such as Bluetooth communication protocol, IEEE 802.11 communication protocol, or other appropriate wireless communication standards. Accordingly, digital media storage device 116 is enabled to operate in accordance with or to communicate with the wireless communications standard used for the wireless communication link.

The communication link between in-vehicle control system 106 and digital media storage device 116 enables extraction of meta data from the media files stored in digital media storage device 116 to in-vehicle control system 106. Subsequently, the playback of the media files is controlled from user interface 126 or audio input device 128. For example, after a communication link is established between a digital media storage device 116 and in-vehicle control system 106, the process of extracting the meta data may begin upon establishing the communication link or as a result of a command by a user. The user may provide the command via inputting the command into the user interface 126 or spoken commands into audio input device 128. For example, a song may be played through in-vehicle control system 106 and audio system 104 by receiving an oral command from a vehicle occupant and sending the playback command to digital media storage device 116 via wireless communication link 118. Audio information received by in-vehicle control system 106 may be provided to the user via audio system 104 (e.g., via audio output devices, not shown) and data retrieved from the digital media storage device 116 may be displayed on output display 108. Digital media storage device 116 may be located anywhere within the proximity of vehicle 100, such as in an occupant's pocket or briefcase, in the trunk or within a range of communication with communications device 120.

Figure 4:
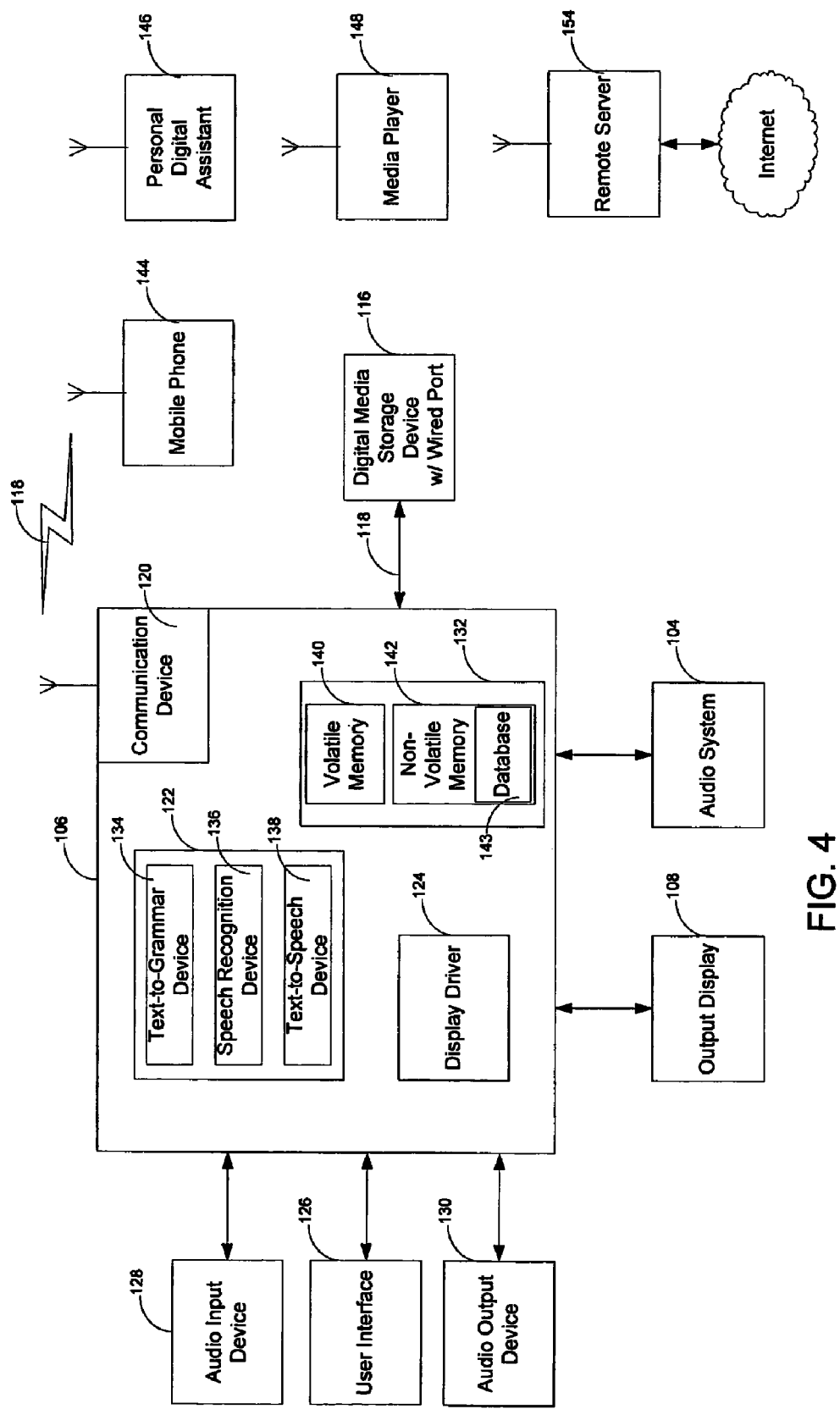
FIG. 4 is a more detailed embodiment of the in-vehicle control system of FIG. 3 according to one exemplary embodiment.

FIG. 4 is a block diagram of a control system for extracting meta data from a digital media storage device in a vehicle including the in-vehicle control system 106 of FIG. 3. Memory device 132 includes volatile memory 140 and non-volatile memory 142 for storing computer or software programs to perform functions of in-vehicle control system 106. For example, memory device 132 includes a predetermined vocabulary of command words that may be recognized by speech recognition device 136 of data processing module 122. The predetermined vocabulary may be used to manipulate systems and applications in the vehicle, in order to perform a function. Speech recognition device 136 is configured to recognize words or phrases in an oral command and to compare the recognized word to the predetermined vocabulary of command words, in order to determine an appropriate action and/or the appropriate system or application to which an instruction should be delivered. Data processing module 122 also includes a text-to-speech device 138 and a text-to-grammar device 134. Text-to-speech device 138 is configured to convert text (e.g., ASCII text) to an audio representation (e.g., PCM) that may be played through audio output devices 126 or audio system 104. Text-to-grammar device 134 is configured to convert text (e.g., ASCII text) to a phonemic representation that may be used by speech recognition device 136 to recognize words or text in an oral command from a user. Text-to-speech device 138 and text-to-grammar device 134 may be part of the same application or different applications. Text-to-speech and text-to-grammar technologies known in the art may be used such as Embedded ViaVoice® Text-To-Speech engine and Text-to-grammar device, manufactured by International Business Machines Corporation.

Memory device 132 includes a database 143, which may also be used to store meta data for the media files of each unique digital media storage device or other mass storage device for use by a user during operation of the control system with a particular digital media storage device. Memory device 132 may include meta data for each media file extracted from a digital media storage device. The meta data of each media file includes a plurality of entries. Each media file comprises audio data and meta data, wherein the meta data may include a plurality of entries, representing a context of each media file in memory device 132, such as song title (e.g., "We Belong Together"), album title (e.g., "Breakthrough"), artist (e.g., John Doe), genre (rhythm and blues), time length (e.g., 3:10), and track number (Track 5), etc. In FIG. 4, digital media storage device 116 include media file data, such as song title, album title, artist, genre, time length, track number, etc., stored in, for example, memory of digital media storage device 116. A user may utilize known methods to add, edit, and otherwise manipulate media files in digital media storage device 116. The memory of digital media storage device 116 may also include meta data for each media file of digital media storage device 116. Each media file may include a plurality of entries, representing a context of each media file in memory, such as song title, album title, artist, genre, time length, and track number, etc. As mentioned, in-vehicle control system 106 includes database 143 stored in memory device 132. Preferably, database 143 is stored in non-volatile memory 142 (e.g., flash EPROM) and is, therefore, maintained across power cycles of the control system.

Note that digital media storage device 116 may be any suitable digital media storage device that includes a transceiver and is able to interface with in-vehicle control system 106 over communications link 118, in either a wireless or wired embodiment. In various exemplary embodiments, digital media storage device 116 may be one or more of a mobile phone 144, a personal digital assistant (PDA) 146, a media player 148, a personal navigation device (PND) 150, a remote server 154 that is coupled to the internet, or various other remote data sources.

In one embodiment, the media file data are retrieved automatically by in-vehicle control system 106 when a wireless communications link is established between in-vehicle control system 106 and digital media storage device 116. In one embodiment, media file data 128 retrieved from digital media storage device 116 may be stored in volatile memory 140 (e.g., DRAM). Accordingly, the media file data stored in volatile memory 140 is not preserved across power cycles of the control system. In an alternative embodiment, the media file data may be stored in non-volatile memory 142 (database 143 shown in FIG. 4) and may be maintained across power cycles and available to a user after power-on initialization. When a second wireless communications link is established with a different digital media storage device (e.g., the digital media storage device of another vehicle occupant), the data in volatile memory 140 may be overwritten with the media file data from the second digital media storage device. Alternatively, each user may have a media files with meta data from their associated digital media storage device stored in non-volatile memory 142. In this embodiment, the media file data for a particular digital media storage device 116 would only be accessible when that particular user's digital media storage device 116 is connected to the control system via the wireless communications link. Each digital media storage device 116 may have a unique identifier that identifies one user's digital media storage device 116 from another digital media storage device.

Figure 5:
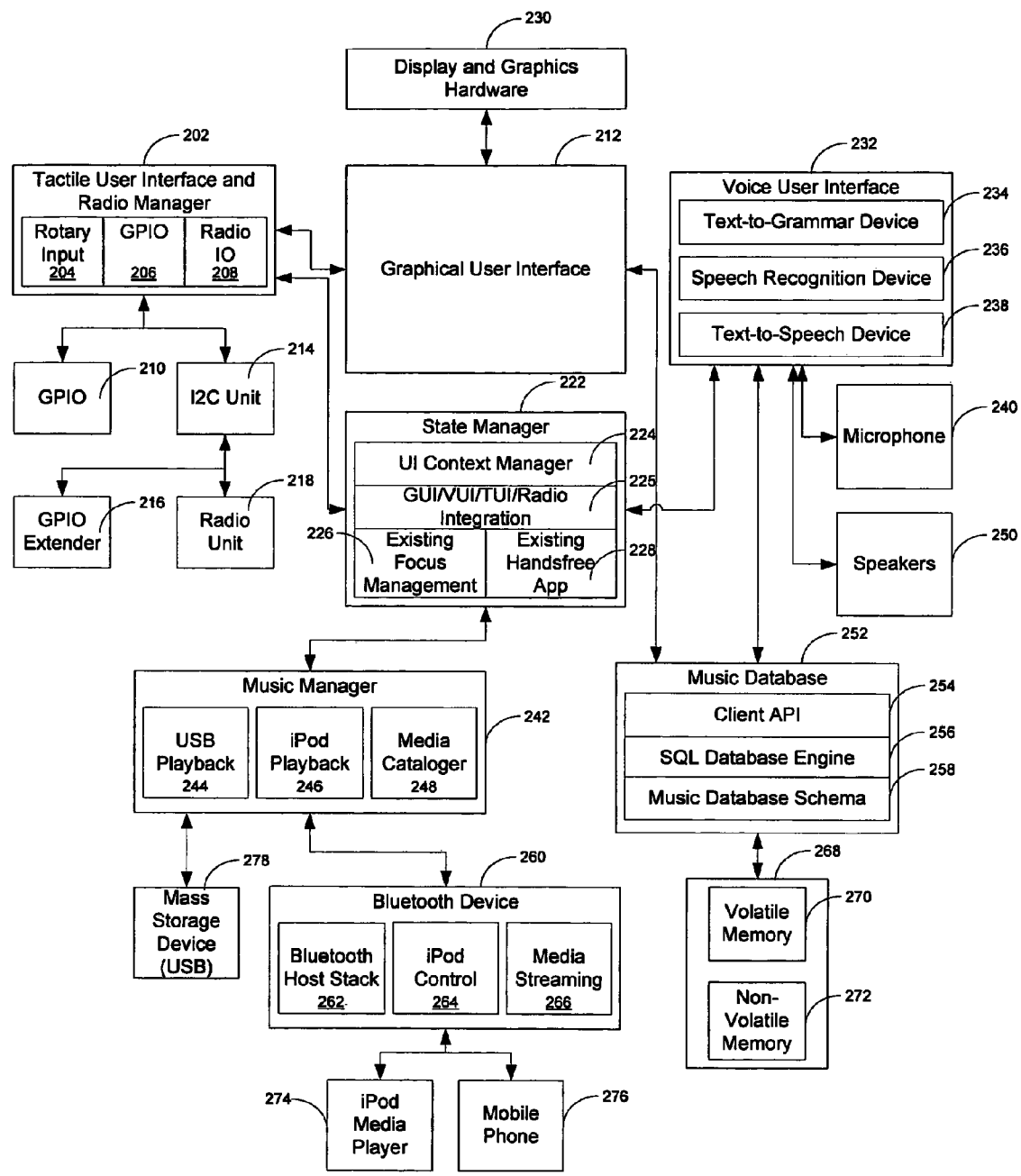
FIG. 5 is a block diagram of a control system for extracting meta data from a digital media storage device in a vehicle including the in-vehicle control system of FIG. 4 according to one exemplary embodiment.

FIG. 5 is a block diagram of an integrated system for controlling a vehicle's audio and telephony systems. In-vehicle control system 106 of FIG. 4 enables a user to connect a digital media storage device, such as an iPod® digital media storage device, in order to extract meta data from the digital media storage device. FIG. 5 illustrates a preferred embodiment of the software architecture employed to support a control system of FIG. 3.

Music manager 242 includes a media cataloger 248 which is configured to extract the meta data from the connected media device (e.g., mass storage device, digital media storage device, mobile phone, etc.). In the case of mass storage device 278, it may be connected via a universal serial bus (USB) connection. Media cataloger 248 searches through the file structure of mass storage device 278, in order to identify audio media stored in memory of the device. Media cataloger 248 is configured to parse the media file to locate the embedded metadata (ID3 tags) and extract them. USB Playback 244 decodes the audio media during file reading and playback of the audio media files. Media cataloger 248 also searches through the audio media files for various file parameters, including an ID3 tag, which is a tagging format for MP3 files. Media cataloger 248 may be configured to perform the meta data extraction on a file by file basis, such that media cataloger 248 creates a database, which is shown as music database 252. Media cataloger is configured to request that the user re-catalog the media files on the device, when it detects that a modification or addition has been made to the media files. It should be understood that mass storage device 278 may include media storage devices, such as a thumb drive, a USB stick, etc.

In the case of digital media storage device 274 (such as an iPod® digital media storage device), it may connect to music manager 242 through a wireless connection with a Bluetooth dongle. An after-market dongle, called naviPlay™, is currently manufactured by TEN Technology. Impulsesoft Corporation also created a proprietary protocol that enables the system to extract the meta data from an iPod® digital media storage device. Upon connecting the Blue tooth dongle with an iPod® digital media storage device, the iPod control 264 recognizes that an iPod® digital media storage device is connected. Media cataloger 248 interfaces with Bluetooth control module 260, in order to request the meta data over the Bluetooth connection. Media streaming 266 includes a streaming profile such as advanced audio distribution profile (A2DP), which is used for controlling the streaming of audio data from digital media storage device 274 or mobile telephone 276 to the system. It should be further understood that the scope of the present invention is not limited to an iPod® digital media storage device. Digital media storage device 274 may include any of several types of media storage devices, digital audio/video players, etc., capable of storing media files in memory.

Additionally, mobile telephone 276 is shown coupled to Bluetooth control module 260 through Bluetooth host stack 262. Bluetooth control module 260 preferably includes a hands-free profile, in order to inter-operate with the Bluetooth HFP-enabled mobile phone. Alternatively, mobile phone 276 may be a Bluetooth-enabled phone with a hands-free profile. In an alternative embodiment, mobile telephone 276 may also include a digital media storage device for streaming-in media files over a Bluetooth connection. Mobile telephone 276 is configured to stream-in audio via media streaming 266. Media cataloger 248 is further configured to extract the meta data from mobile telephone 276, wherein the meta data are stored in music database 252.

Music database 252 preferably includes a client application programming interface (API) 254 for media cataloger 248 to invoke for requests for cataloging media files. Music database 252 may also include SQL database engine 256 and music database schema 258, serving as a relational database management system. A memory module 268 is coupled to music database 252. Music database 252 includes a volatile memory 270 (e.g., RAM) and a non-volatile memory 272 (e.g., flash). Accordingly, a meta data catalog stored in volatile memory 270 is not preserved across power cycles of the system, whereas the media file may be stored in non-volatile memory 272 and may be maintained across power cycles and available after a power-on initialization.

Once the media device (e.g., mass storage device 278, digital media storage device 274, mobile phone 276, etc.) has connected, music manager 242 informs state manager 222 that a media device has been located (e.g., a Bluetooth-enabled device is found or a mass storage device has been connected). If cataloging for the media device is necessary, music manager 242 informs state manager 222 that cataloging has been completed. State manager 222 uses these data to update graphical user interface (GUI) 212 and voice user interface (VUI) 232 that cataloging is occurring and/or has been completed via UI Context Manager 224 and integration module 225. The interface between state manager 222, GUI 212, and VUI 232 demonstrate how a synchronous multimodal user interface is achieved. Existing focus management 226 controls various vehicle systems when multiple systems are in use at the same time. Existing hands-free application 228 controls the operation of the connected mobile phone and other vehicle systems when the mobile phone receives a call. For example, if the user is playing back music when the mobile phone receives a call, the system may be configured to pause music playback at that time. Subsequently, the user can disconnect the call and have the music playback automatically resume.

VUI 232 includes speech recognition engine 234, text-to-speech engine 236, and text-to-grammar device 238. Audio input device 240 and audio output devices 250 are preferably coupled to VUI 232 for processing various data signals, such as audio signals (e.g., oral input commands, audio output data, etc.). When the cataloging process is complete, state manager 222 notifies VUI 232 that the media device has been cataloged. Upon receiving the update from state manager 222 that cataloging is complete, VUI 232 is configured to parse through music database 252 for each of the entries of the meta data and convert the entries to an phonemic representation (i.e., phonemic representation of the entry). The phonemic representations are stored in a phonemic representation list in volatile memory 270. Therefore, the phonemic representation list is not preserved across power cycles of the system. In an alternative embodiment, music manager 242 is notified by a power module (not shown) that the system is shutting down. Music manager 242 writes the RAM-based database(s) to non-volatile memory 272, in order to be maintained across power cycles.

Additionally, VUI 232 includes software logic for converting text data, including acronyms, punctuation, and unique sounding names, into an phonemic representation. Text-to-speech engine 236 is configured to convert several such meta data entries. For example, text-to-speech engine 236 is configured to recognize and convert the artist's name "INXS," which phonetically sounds like "in excess." Another example would be the artist's name ".38 Special," which phonetically sounds like "thirty-eight special" instead of "point three eight special" In one embodiment, the software logic is embedded directly into VUI 232, wherein VUI 232 best converts the text data according to its own rules. In an alternative embodiment, the system may use a connected mobile phone (e.g., mobile phone 276) to create a dial-up connection to the Internet to access an online music database. Alternatively, the system can access a shared network drive or a database that includes a phonetic representation in speech synthesis mark-up language (SSML). Text-to-speech engine 236 may use the SSML to pronounce the entry correctly and to create the correct phonemic representation for the entry of the meta data.

Music manager 242 further includes a USB playback 244 and iPod® digital media storage device playback 246. Using either in GUI 212 or VUI 232, the user may select a mode to playback media files with USB playback 244 or iPod® digital media storage device playback 246. When the user selects a mode of playback, GUI 212 and/or VUI 232 determine how playback will happen. Upon selecting the artist to be played (e.g., "play the Beatles"), state manager 222 notifies music manager 242, and music manager 242, through the two playback sub-components, accesses music database 252 through the client API 254 to find all the tracks associated with the specified artist. The tracks may then be played back in a pre-determined order or at random. For example, a user may decide to playback the Beatles' albums in alphabetical order and then within the albums, in the individual track order. Alternatively, a user may decide that to play the albums in the chronological order, starting with the first Beatles' album.

Tactile user interface (TUI) 202 includes rotary input 204, general purpose input/output (GPIO) 206, and radio input/output ("radio 10") 208. TUI 202 is coupled to GPIO 210 and I2C unit 214 (or I2C), which is a serial bus. I2C unit 214 is coupled to GPIO Extender 216 and radio unit 218. Radio unit 218 preferably includes an AM/FM tuner, a power amplifier, equalizer, a satellite radio, and an auxiliary input.

As the system is playing back the selected track, music manager 242 preferably provides playback status of the track. Media cataloger 248 is configured to perform the meta data extraction, which includes extracting data such as song title, album title, artist, genre, time length, track number, the elapsed time, the recording label, featured artist(s), etc.

State manager 222 is configured to provide the playback status to GUI 212 and VUI 232. GUI 212 can show the playback status of the current track in the list of the selected tracks. VUI 232 also allows the user to "barge in," to the playing track and input a desired command. For example, a user may press a button, in order to activate speech recognition engine 234, and, then, the user may utter the appropriate command to begin playback of another media file (e.g., "next," "pause," "play 'Yellow Submarine'").

Figure 6:
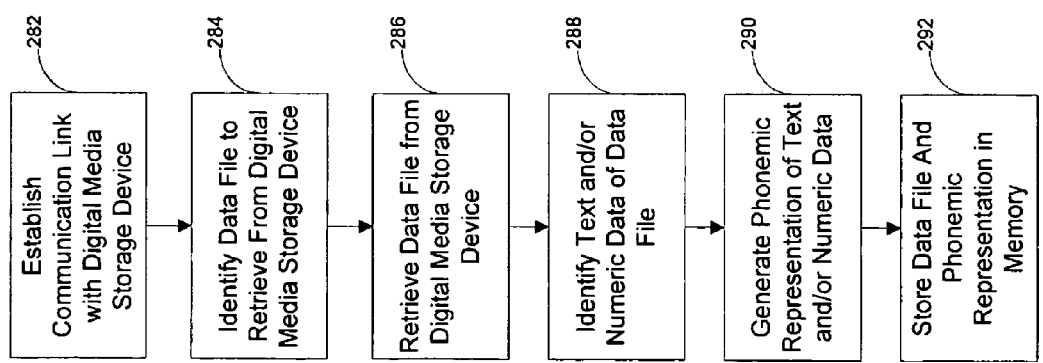
FIG. 6 is process flow diagram illustrating a method of generating a phonemic representation of data with the in-vehicle control system of FIG. 3 according to one exemplary embodiment.

FIG. 6 illustrates a general method of generating a phonemic representation of data from certain data accessed from digital media storage device 116 with in-vehicle control system 106.

At step 158, in-vehicle control system 106 establishes communications link 118 (shown in FIGS. 3 and 4) with digital media storage device 116. In various exemplary embodiments, in-vehicle control system 106 may establish a wireless or wired link.

At step 160, in-vehicle control system 106 identifies a data file to retrieve from digital media storage device 116. In one exemplary embodiment, in-vehicle control system 106 may identify a data file based on input from a user, including speech or manual user input. In other exemplary embodiments, in-vehicle control system 106 may identify a data file based on a signal from digital media storage device 116 or based on an algorithm executed by in-vehicle control system 106.

At step 162, in-vehicle control system 106 retrieves the identified data file of step 160 from digital media storage device 116 over communications link 118.

At step 164, in-vehicle control system 106 identifies textual and/or numeric data contained in the retrieved data file of step 162.

At step 166, text-to-grammar device 134 of in-vehicle control system 106 generates a phonemic representation of the textual and/or numeric data identified in step 164. In various exemplary embodiments, the generation of a phonemic representation may be accomplished by any past, present, or future text-to-grammar methodology.

At step 168, in-vehicle control system 106 stores the retrieved data file of step 162 and the phonemic representation created in step 166 in memory 132. In one exemplary embodiment, the phonemic representation may be stored with the data file in an adjacent memory cell. In other exemplary embodiments, the phonemic representation may be stored in an area of memory 132 separate from the data file provided that a link associating the memory items is created and maintained.

Figure 7:
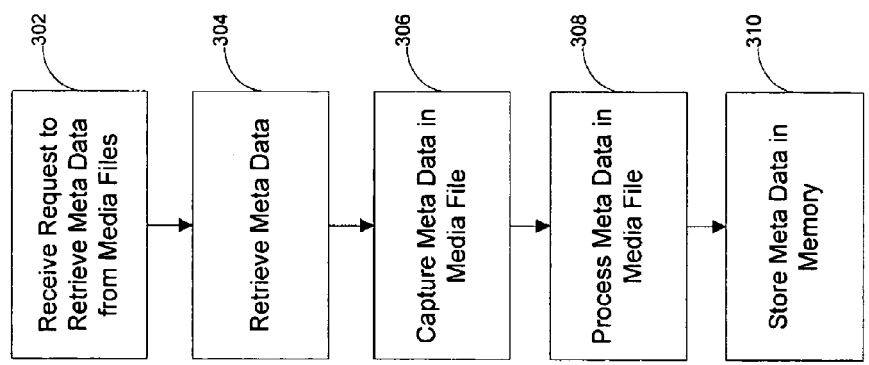
FIG. 7 is a process flow diagram illustrating a method of retrieving and processing meta data from media files within a digital media storage device with the in-vehicle control system of FIG. 3 according to one exemplary embodiment.

FIG. 7 illustrates a method for retrieving media file data from a digital media storage device in response to a user command in accordance with an embodiment. Media file data from digital media storage device 116 is retrieved in response to a command from a user in the vehicle. The command may be received via user interface 126 (e.g., a button or switch) or as an oral command via audio input device 128. After wireless communications link 118 is established between in-vehicle control system 106 and digital media storage device 116, a user may provide a command to retrieve media file data from the digital media storage device.

At step 302, in-vehicle control system 106 (shown in FIG. 4) receives a command from a user to retrieve media file data from the connected digital media storage device. As mentioned, a user may provide a request via user interface 126 (FIG. 4), for example, using a button or switch. Alternatively, the user may provide an oral command to request retrieval of the meta data.

At step 304, in-vehicle control system 106 sends a request to the digital media storage device 116 via the wireless communications link and retrieves the meta data from the digital media storage device 116. Once the media file data are transferred to in-vehicle control system 106, the data are captured in a file at step 306. The retrieved media files are then processed at step 308 before being stored in memory device 132. After processing, the media files are stored in memory device 132 (shown in FIG. 4).

As mentioned previously, the media file data may be stored in volatile memory 140 (shown in FIG. 4). Accordingly, the media file data are not preserved across power cycles of the control system. Preferably, the media file data may be stored in non-volatile memory 142 (shown in FIG. 4) and may be maintained across power cycles and available to a user after power-on initialization. As mentioned above, when a wireless communications link is established with a different digital media storage device (e.g., the digital media storage device of another vehicle occupant), the data in volatile memory 140 is overwritten with the media file data from the new digital media storage device.

Figure 8:
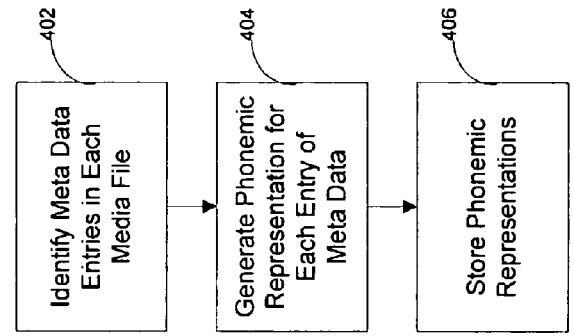
FIG. 8 is a process flow diagram illustrating a method of generating a phonemic representation of data associated with meta data entries in a media file with the in-vehicle control system of FIG. 3 according to one exemplary embodiment.

FIG. 8 illustrates a method for processing media file data from digital media storage device 116. At step 402, in-vehicle control system 106 (shown in FIG. 4) accesses the media files and identifies the individual entries of the meat data such as song title, album title, artist, genre, time length, track number, the elapsed time, recording label, featured artist, etc. A phonemic representation may be generated for the text data of each entry of a media file using text-to-grammar device 134 (shown in FIG. 4). The phonemic representation is a phonemic representation that may be used by the speech recognition device 136 (shown in FIG. 2) to recognize a user's utterance and, therefore, allow speech recognition to be performed against each entry of a media file.

At step 404, an phonemic representation is generated based on the text data of the media file. At step 406, the phonemic representations are stored in a phonemic representation list that is associated with the media files. Accordingly, speech recognition may be performed against the text data of a media file. Returning to FIG. 4, once the media file data are stored in memory in step 310, the media files are available to a user for speech-enabled manipulation of a media file.

As mentioned, a user may manipulate (e.g., play, pause, stop, next, previous, fast-forward, rewind, etc.) a media file using an entry of the meta data stored in memory. FIG. 9 illustrates a method for speech-enabled playback using memory device 132 in accordance with an embodiment. At step 502, a in-vehicle control system 106 (shown in FIG. 4) receives a command to initiate playback of a media file from a user via audio input device 128.

In one embodiment, in-vehicle control system 106 prompts the user to indicate which media file to playback, at step 504. The prompt may be played via audio output devices 126 or the audio system 104. Alternatively, the user may provide (i.e., utter) the entry name with an oral command to play a song (e.g., "play <track title>").

After the system receives the track title of the desired media file at step 506, the system identifies the desired entry at step 508. If there are similar entries in the memory device 132, the speech recognition device 136 selects the best match.

At step 510, the speech recognition engine determines if there is more than one entry associated with an phonemic representation. For example, if the user commands the system to "play The White Album," the system may be configured to recognize that more than one media file is associated with that album title. In-vehicle control system 106 may be configured to list (via an audible prompt or via output display 108) the associated media files (e.g., songs or tracks) for that album name. Alternatively, in-vehicle control system 106 can also be configured to just begin playback of the media files (i.e., tracks) of the album from the beginning of album or from a pre-selected track number.

The user may then select a media file at step 512. Once a media file has been determined, in-vehicle control system 106 prompts the user to confirm the track title of the media file at step 514. After confirmation is received at step 516, in-vehicle control system 106 begins playback of the media file. Alternatively, the system may be configured to determine that there is more than one album with a particular phrase in the album title (e.g., "Greatest Hits"). In this case, in-vehicle control system 106 is configured to recognize that more than one album title includes the uttered phrase, based on a confidence scoring algorithm. Speech recognition device 136 provides the best matches, and the user is then prompted to select the desired album from among the matches.

In-vehicle control system 106 (FIG. 4) is also configured to provide a user with a listing of the meta data of the available media files upon request (e.g., "list albums," "list artists," etc.). FIG. 10 illustrates a method for audibly listing media files, in accordance with an embodiment.

At step 602, in-vehicle control system 106 receives a command from the user via a audio input device 128 (FIG. 4) to list the contents of database 143 by meta data entry type.

In response to the command, in-vehicle control system 106 audibly list the meta data entries of each media file at step 604. For example, if the user's command is "list albums," each album title would be listed. The text (e.g., album title) of each media file is converted to an audio representation using text-to-speech device 138 and the audio may be played in the vehicle using audio output devices 126 or audio system 104. Preferably, the text of the entries is displayed in alphanumeric order sorted character by character on output display 108.

A predetermined time period elapses between the playing of each entry. In addition, in-vehicle control system 106 is configured to allow the user to interrupt the audible listing of the selected meta data by permitting the user to "barge-in." A user may barge in during the playing of an entry text or during a predetermined time after the playing of the entry in order to execute a command. If the user provides a command (i.e., barges in) at step 606, the in-vehicle control system 106 recognizes and performs the requested action at step 608. For example, a user may provide a command to skip to the next entry in the list of selected meta data or to skip to the entry beginning at the next alphanumeric character. A user may also provide commands to select a desired media file once it is heard or to repeat a previous entry. If a media file is selected, a user may then initiate an action (e.g., playback of a media file).

When the last media file is reached (or when a file is selected) at step 610, the process ends. If the last entry has not been reached, the process returns to step 604 and continues until either an entry is selected or the last entry in the database 143 is reached.

Figure 11:
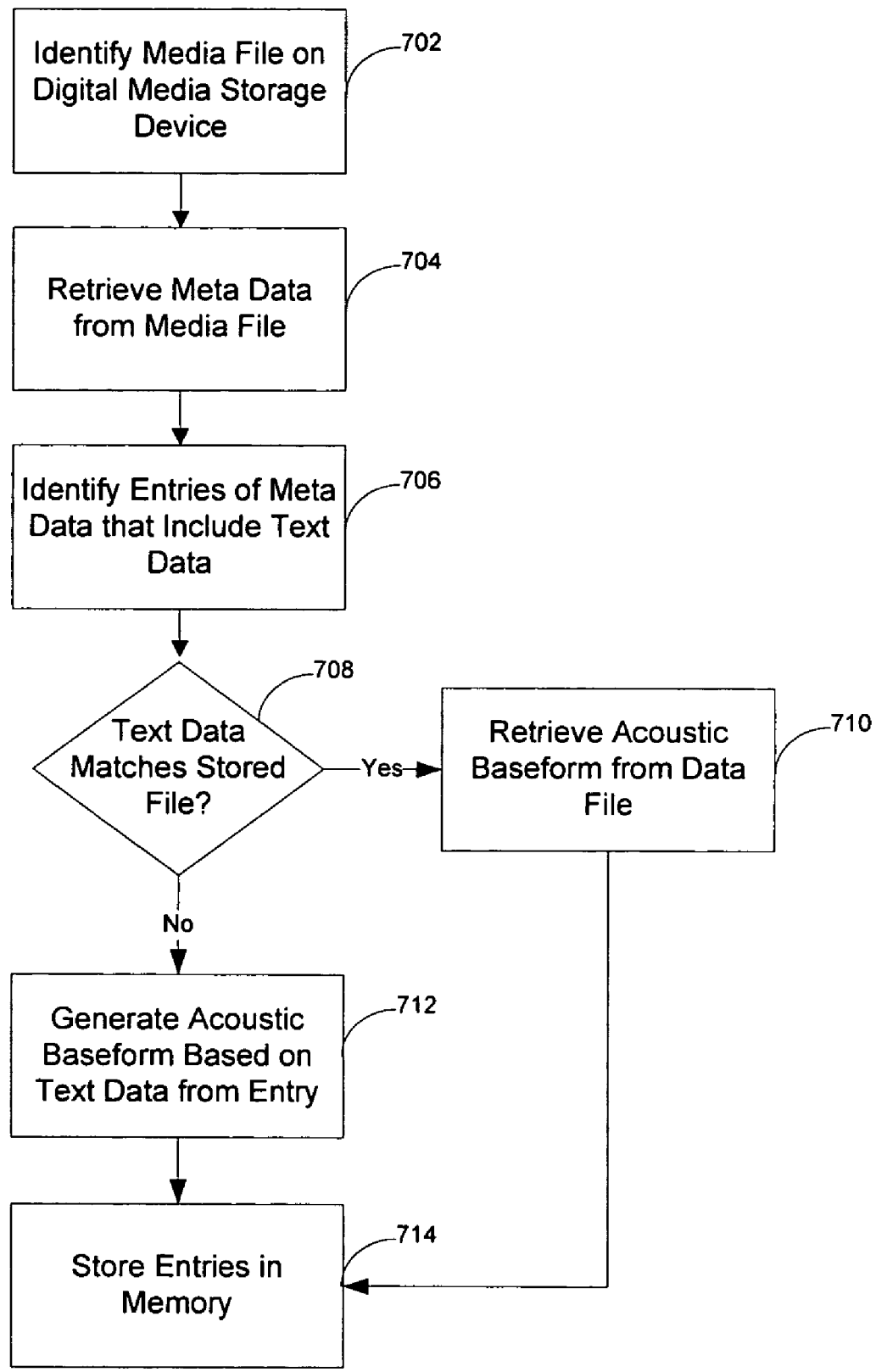
FIG. 11 is a process flow diagram illustrating a method of extracting meta data from a digital media storage device using the in-vehicle control system of FIG. 3 according to one exemplary embodiment.

FIG. 11 is a process flow diagram illustrating a method of extracting meta data from digital media storage device 116 using in-vehicle control system 106 of FIG. 4. The method is intended to increase the accuracy and efficiency of matching oral commands to meta data associated with song files. A database of known media files and associated meta data and phonemic representations is first accessed and if not present a new phonemic representation is generated.

At step 702, in-vehicle control system 106 identifies a selected media file on digital media storage device 116 using the files meta data. The data file may be selected either by a user or automatically by in-vehicle control system 106.

At step 704, in-vehicle control system 106 retrieves the meta data from the selected and identified media file of step 702. At step 706, entries of the retrieved meta data that include text data are identified. For example, the method may identify an entry that contains information related to a song title, album title, playlist, artist name, or any other data that may be related to a media file.

At step 708, the identified text data entries are compared with stored data files in database 143. Database 143 may store meta data and associated phonemic representations for various media files. As mentioned above, preferably database 143 is stored in non-volatile memory 142 and may be updated based on media files accessed by a user or may alternatively be updated by the upload of external data, for example over wired port communication link 118. In other exemplary embodiments, may be stored in volatile memory 140 or on digital media storage device 116 such as mobile phone 144, personal digital assistant 146, media player 148, remote server 154, or any combination thereof.

At step 710, if a text data entry matches at least one of the stored data files, an acoustic baseform of the text data based on a phonemic representation is retrieved from a file associated with the stored data file in database 143.

At step 712, if the text data entry does not match at least one of the stored data files, an acoustic baseform of the text data based on a phonemic representation of the text from the entry is generated using text-to-grammar device 134.

At step 714, if an acoustic baseform has been generated in step 712, the baseform and the associated entry are stored in database 143, preferably in non-volatile memory 142, as mentioned above.

While the exemplary embodiments illustrated in the figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with figures should not be construed as imposing on the invention any limitations that may be present in the figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for extracting meta data from a digital media storage device in a vehicle over a communication link between a control module of the vehicle and the digital media storage device, the method comprising:
   retrieving meta data from the digital media storage device over the communication link using the control module of the vehicle, the meta data associated with a media file from the digital media storage device, the meta data comprising text data;
   comparing the text data with a plurality of stored data entries using the control module;
   providing to a processing module, for user a interface, a phonemic representation for the text data based on a pre-stored phonemic representation associated with a stored data entry when the text data matches the stored data entry, the phonemic representation provided by a memory device of the control module;
   storing the meta data in the memory device of the vehicle; and
   creating a link between the stored meta data and the phonemic representation for the text data; and
   maintaining the link in the memory device across power cycles of the control module and using the link in the memory device to provide for phoneme-based speech recognition of the stored meta data.

2. The method according to claim 1, further comprising:
   generating a new phonemic representation based on the text data when the text data does not match at least one of the stored data entries.

3. A method according to claim 1, wherein the meta data are retrieved in response to a command by a user.

4. A method according to claim 3, wherein the command from the user is received via a user interface.

5. A method according to claim 3, wherein the command is a spoken command.

6. A method according to claim 1, wherein the communication link between the control system and the digital media storage device is wireless.

7. A method according to claim 1, wherein the plurality of stored data entries includes any of the following: song title, album title, artist, genre, time length, track number, elapsed time, recording label, recording date, composer, producer, and featured artist.

8. A method according to claim 1, wherein stored data entries are stored in memory associated with the control module and mounted in the vehicle.

9. A method according to claim 1, further comprising:
   updating the stored data entries via a second communication link between the control module and an external source.

10. A method according to claim 1, further comprising:
    recognizing speech received from a user at an audio input device by comparing the received speech to the phonemic representations.

11. A control system for mounting in a vehicle and for extracting meta data from a digital media storage device over a communication link, the control system comprising:
    a communication module configured to establish a communication link with the digital media storage device;
    a processing module coupled to the communication module, the processing module configured to retrieve, via the communication module, meta data associated with a media file from the digital media storage device, the meta data including a plurality of entries, wherein at least one of the plurality of entries includes text data, the processing module further configured to compare the text data of the entries with a set of stored data records; and
    a memory module configured to store the plurality of entries retrieved from the digital media storage device,
    wherein the processing module is configured to provide a phonemic representation of the text data based on a phonemic representation previously associated with a stored data record of the set of stored data records when the text data matches the stored data record;
    wherein the processing module is further configured to store the meta data in a memory device of the vehicle and to create a link between the stored meta data and the phonemic representation for the text data; and
    wherein the processing module is further configured to maintain the link in the memory device across power cycles of the control system and to use the link in the memory device to provide for phoneme-based speech recognition of the stored meta data.

12. A control system according to claim 11, wherein the processing module is further configured to generate a new phonemic representation of the text data when the text data does not match at least one of the stored data records.

13. A control system according to claim 11, wherein the processing module is configured to identify the text data of an entry and to generate a phonemic representation of the text data of the entry.

14. A control system according to claim 11,
    wherein the processing module is further configured to use input received from a user interface to select at least one media file based on the media file's associated meta data, and wherein the processing module is further configured to cause the playback of the media file's audio data via an audio system.

15. A control system according to claim 14, wherein the user interface comprises a display and the processing module is configured to provide meta data to a user via the display.

16. A control system according to claim 11, further comprising:

an audio input device configured to receive oral input commands from a user.

17. A control system according to claim 16, further comprising:
a speech recognition module configured to compare the oral input commands to a predetermined set of input commands, wherein the speech recognition module determines an appropriate response based on the oral input commands.

18. A control system according to claim 11, further comprising:
a text conversion engine configured to convert the text data of an entry to an audible speech representation of the text data.

19. The method according to claim 1, further comprising:
receiving a signal representative of an oral command from an audio input device;
processing the signal representative of the oral command to determine if a phonemic representation of the oral command matches a phonemic representation provided by the control module; and
conducting an action based on the presence of a match and using the maintained link.

20. The system according to claim 11, wherein the processing module is configured to receive a signal representative of an oral command from an audio input device, wherein the processing module processes the signal representative of the oral command to determine if a phonemic representation of the oral command matches a phonemic representation previously associated with the stored data record, and the processing module conducts an action involving the meta data or the media file associated with the meta data based on the presence of a match and using the maintained link.

* * * * *